UNITED STATES PATENT OFFICE.

ALFRED EINHORN, OF MUNICH, GERMANY, ASSIGNOR TO FARBWERKE VORM. MEISTER, LUCIUS & BRÜNING, OF HÖCHST-ON-THE-MAIN, GERMANY, A CORPORATION OF GERMANY.

PROCESS OF MAKING ALKYL-BARBITURIC ACIDS.

No. 795,495. Specification of Letters Patent. Patented July 25, 1905.

Application filed November 28, 1904. Serial No. 234,516.

*To all whom it may concern:*

Be it known that I, ALFRED EINHORN, Dr. Rer. Nat., professor of chemistry, a citizen of the Empire of Germany, residing at Munich, Germany, have invented certain new and useful Improvements in the Manufacture of Alkyl-Barbituric Acids, of which the following is a specification.

I have found that carbonates of phenols when heated with alkyl-malonamids may be transformed into derivatives of barbituric acid, the reaction corresponding to the following equation:

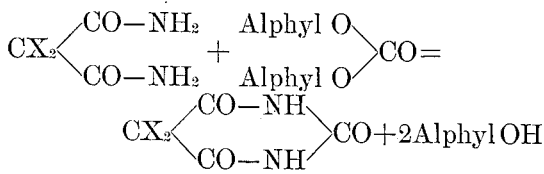

The reaction is analogous to that observed by Cazeneuve on heating oxalamid with phenyl-carbonate, (*Comptes rendus*, 129, 834;) but while Cazeneuve obtained only a yield of five per cent. of parabanic acid that of alkyl-barbituric acids is up to fifty per cent. and more of the theoretical yield if in the process the temperature at which the reaction takes place be kept for a considerable time.

The process may be carried out, for instance, as follows:

Example I: Five grams diethyl-malonamid are heated with twenty grams of phenyl carbonate to 200° to 220° centigrade. The phenol formed may be distilled off together with the excess of phenyl carbonate. After heating for eighteen hours the residue is treated with dilute caustic-soda lye, the undissolved phenyl carbonate is filtered off, and from the solution the diethyl-barbituric acid may be separated in the known manner. 3.5 grams of diethyl-barbituric acid are obtained.

Example II: One gram of diethyl-malonamid is heated with three grams of phenyl-ethyl carbonate from 210° to 220° centigrade for fifteen hours, and from the residue the diethyl-barbituric acid is obtained in the quantity of 0.2 gram.

Having now described my invention, what I claim is—

1. The process herein described for the manufacture of alkyl-barbituric acids, which consists in heating carbonates of phenols with alkyl-malonamids.

2. The process herein described for the manufacture of diethyl-barbituric acid, which consists in heating diphenyl carbonate with diethyl-malonamid.

3. The process herein described for the manufacture of diethyl-barbituric acid, which consists in heating diphenyl carbonate with diethyl-malonamid for a considerable time to a temperature of from 190° to 250° centigrade.

In testimony that I claim the foregoing as my invention I have signed my name in presence of two subscribing witnesses.

ALFRED EINHORN.

Witnesses:
 ULYSSES J. BYWATER,
 ABRAHAM SCHLESINGER.